2,693,540

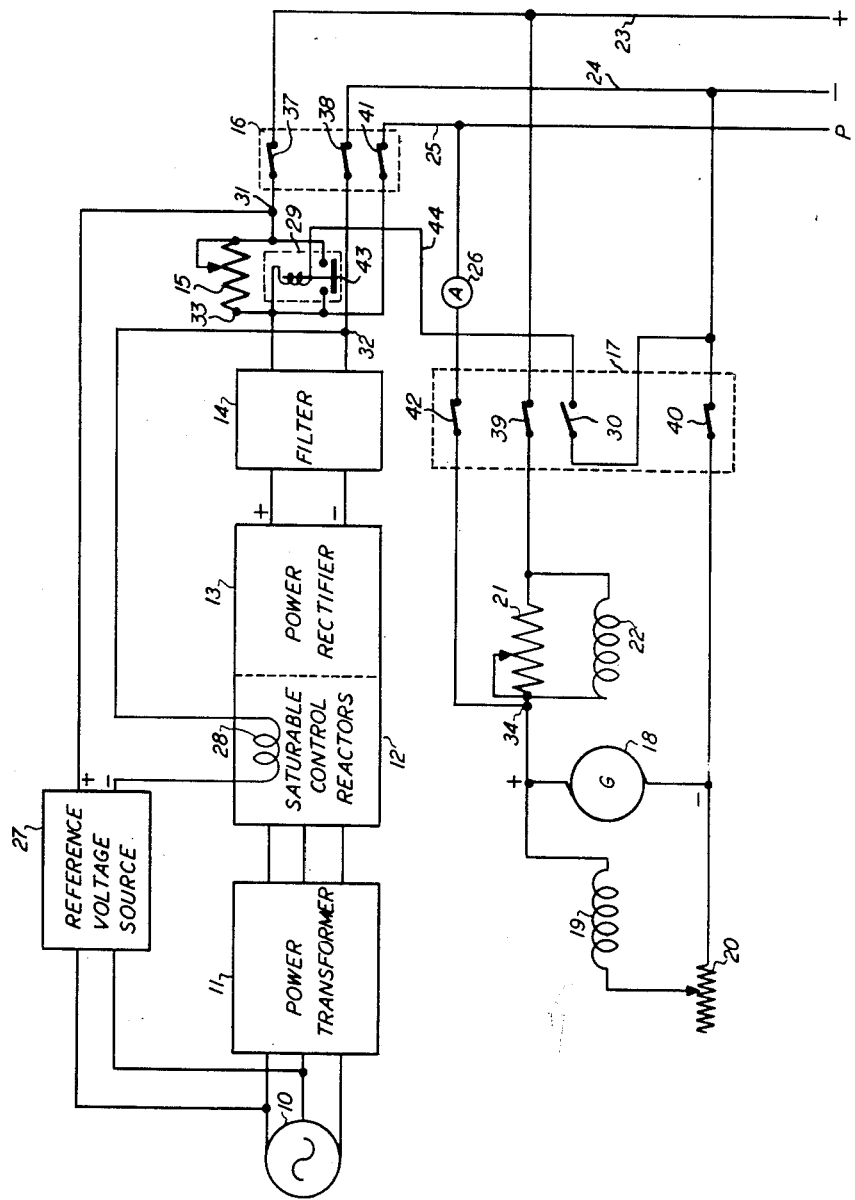

VOLTAGE AND CURRENT REGULATOR

Henry M. Huge, Lorain, Ohio, assignor to Lorain Products Corporation, a corporation of Ohio Application February 21, 1951, Serial No. 212,109

6 Claims. (Cl. 307—57)

This invention deals with a voltage and current regulator and in particular with a circuit for regulating the output of a direct current generator operated in parallel with a regulated rectifier-type converter.

Direct current generators of the compound wound or the "diverter pole" type are often used to supply a relatively constant voltage to a load such as a telephone exchange. In the case of a telephone exchange, the exchange battery is floated across the generator which then supplies not only the exchange load but also any charging current required by the battery. When additional direct current capacity is required, it is often desirable to use a regulated rectifier-type converter for furnishing the additional current. The choice of a rectifying arrangement for the additional direct current capacity may be directed by the numerous advantages which such a converter offers. Among these advantages are the higher efficiency, particularly at light loads, the more precise regulation of voltage, the absence of moving parts, and the reduction in maintenance.

When a rectifier-type converter is connected in parallel with a direct current generator, however, the difference in the output voltage characteristics of the two machines results in an unequal division of load between them. If the converter is delivering a constant voltage, the voltage variations normally occurring in the output of the generator may cause the load current at one time to be assumed entirely by the converter and at another time to be assumed entirely by the generator. Furthermore, the advantage of the precise voltage regulation delivered by the converter is lost because the overall voltage variations at the load will be the combined voltage variations of the converter and the generator.

By my invention I overcome these disadvantages and insure that the load current will divide in a proportional manner between the converter and the generator at all times. My invention also maintains the output voltage of the generator at the value set by the regulated rectifier-type converter.

It is an object of my invention to operate a regulated rectifier-type converter in parallel with a direct current generator and to maintain a proportionate division of load between the generator and the converter.

Another object of my invention is to maintain a constant voltage on a direct current bus supplied from a regulated rectifier-type converter and a direct current generator operating in parallel.

A further object of my invention is to operate a direct current generator in parallel with a constant voltage rectifier-type converter and to maintain the output voltage of the generator at the voltage level set by the converter.

Another object of my invention is to insert a resistor between the rectifier and the load terminals of a regulated rectifier-type converter whose output voltage is controlled by a voltage sensing device connected across the load terminals, and to operate the converter in parallel with a direct current generator by connecting the junction between the resistor and the rectifier to the junction between the series field and the armature of the generator.

Another object of my invention is to use a regulated converter to control the output voltage of a direct current generator by inserting in the converter, equalizing resistance means having a voltage drop corresponding to the voltage drop across the series field of the generator and by making an equalizing connection between the resistance means of the converter and the series field of the generator.

Another object of my invention is to obtain an equalizing voltage drop across a resistor in a regulated converter without changing its output voltage, by the use of regulating means responsive to the output voltage.

Another object is to install an equalizing lead between a direct current generator and a regulated rectifier-type converter to insure proportionate load distribution between the generator and the converter, thereby regulating the output voltage of the generator without affecting the output voltage of the converter.

Other objects and a better understanding of my invention may be obtained by referring to the following specification and claims together with the acompanying drawing comprising a single figure which shows a schematic diagram of a circuit embodying the features of my invention.

The circuit of the regulated rectifier-type converter is shown in block diagram form and may comprise a system of the type disclosed in my United States patent application, Serial Number 780,408, filed October 17, 1947. The regulated converter circuit shown in block form comprises a power transformer 11 which supplies current to the power rectifier 13 under the control of saturable control reactors 12. The output of the power rectifier 13 is fed to the load terminals 31 and 32 through the filter 14 and series resistance means 15 having input terminal 33 energized from the rectifier and having its output terminal connected to load terminal 31. The voltage across the load terminals 31 and 32 is balanced against the voltage of the reference voltage source 27 through windings on the saturable control reactors indicated symbolically by a single winding 28. The reference voltage source 27 may be of a type shown in my patent application, Serial Number 780,408, and as shown, may be energized from the source of alternating current 10 which supplies the power to the power transformer 11. With the circuit arrangement as shown, any deviation in the voltage across terminals 31 and 32 from the voltage delivered by the reference voltage source 27 results in a flow of current through the control windings 28. The direction of the current flow through windings 28 is always such as to correct the output voltage across terminals 31 and 32 and maintain it at the level determined by the reference voltage source 27. The direct current terminals 31 and 32 of the converter are connected respectively to direct current bus members 23 and 24 through two switches 37 and 38 of a contactor 16. The direct current generator G comprises armature 18, shunt field 19 regulated by field rheostat 20 and series field 22 with its adjusting rheostat 21. The direct current generator is connected to the direct current bus members 23 and 24 through switches 39 and 40 of a contactor 17.

Terminal 33 of resistor 15 may be referred to as the input terminal of resistor 15, and terminal 34 comprises the junction between the series field 22 and the armature 18 of the generator. Terminal 33 is joined to junction 34 by a connecting wire 25 fed through switches 41 and 42 on both the contactors 16 and 17 and through the ammeter 26. The connecting wire 25 is also designated by the letter P and may be used for making a similar paralleling connection to additional generators to be operated in parallel with the generator G. Although only one direct current generator is shown in the drawing, the wiring for additional generators is exactly the same as that for the generator shown and the circuit operation is substantially unchanged by the addition of more direct current generators having substantially the same full load voltage drop through their series field windings as occurs across the winding 22.

The generator G may be of a standard compound-wound construction or it may comprise a "diverter-pole" type of generator. In either case the connections of the shunt field 19 and the series field 22 are substantially as shown in the diagram. By proper adjustment of the field rheostat 20 and the compounding adjustment 21 which is in parallel with the series field 22, the output voltage of the generator G appearing across the direct current bus members 23 and 24 can be adjusted to substantially the same value at full load as it is at no load. Starting with this initial adjustment, the parallel combination of the converter and the generator will provide a substantially constant voltage across the D. C. bus members 23 and 24 while maintaining a substantially proportionate division of load and at the same time minimizing the circulating current flowing through the lead 25.

The resistor 15 is adjusted so that the full load voltage drop through it is substantially the same as the full load voltage drop through the combination of the series field 22 and its resistor 21. It is not necessary that the converter have the same current rating as the generator, in fact, the generator may have a current rating many times greater than that of the rectifier-type converter. In any case, the adjustment of the resistor 15 to provide the same voltage drop at the full load output current of the converter as the series field and resistor combination 22 and 21 does at the full load output current of the generator insures that the point 34 will be the same potential as the point 33 when the load is divided between the generator and the rectifier in proportion to their current ratings. At any time that the generator attempts to assume more than its share of the load, the voltage drop through the series field 22 will become greater than the voltage drop through the resistor 15 and current will flow through the ammeter 26 and lead 25 from point 34 to point 33. This flow of circulating current will divert current away from the series field 22 and consequently weaken this field. The output voltage of the generator is thereby automatically dropped until it equals the output voltage of the regulated rectifier-type converter. In case the generator fails to assume its share of the load, the voltage drop through the series field 22 will be less than that through the resistor 15 and current will flow from the terminal 33 to the junction point 34, increasing the flow of current through the series field 22 and raising the generator voltage. In general, the circulating current flowing through the ammeter 26 is a relatively small fraction of the total output current and does not generally represent an appreciable departure from the proportional division of load between the converter and the generator unless the generator is very much larger in rated capacity than the converter.

The ammeter 26 is used chiefly in making the proper initial setting for the resistor 15 and the field rheostat 20. Once these two resistors are properly set the ammeter 26 may be removed from the circuit.

In the case mentioned above, in which the converter has a much smaller output than the generator, my invention represents a highly effective and economical means for controlling the output voltage of a direct current generator. It will be understood therefore that my invention is not limited to combinations in which the converter has an output capacity comparable to that of the direct current generator or generators.

When the converter is adequate to carry the load during most of the operating conditions and the generator is brought in only during times of heavy load, it may be desirable to remove the resistor 15 from the circuit during the time that the generator is not operating. In this way, the continuous power loss in this resistor 15 can be eliminated except during the time that the voltage drop through it is actually required for controlling a generator. A circuit arrangement for performing this function is shown on the schematic diagram and comprises a switch 43 of a contactor 29 which shunts the resistor 15. The actuating coil for the switch 43 is energized through a circuit including a conductor 44 and a normally-closed switch 30 on the contactor 17. When the generator is not in operation, the contactor 17 is released thereby opening the switches 39, 40 and 42 and closing the switch 30 which energizes the coil of the switch 43 of the contactor 29 and shorts out resistor 15.

When the regulated converter has internal current limit protection, as disclosed in my patent application, Serial Number 780,408, the overload protection is effective also in limiting the output current of the generator. This action is entirely automatic with respect to the generator because, as previously described, the voltage drop across the series field 22 is maintained at the same level as the voltage drop across the resistor 15 through the action of the equalizer lead 25. Therefore, once the current limiting feature of the converter becomes effective and prevents further increases in the voltage drop across resistor 15, any additional current which the generator attempts to furnish to the load will be divided between the series field 22 and the resistor 15, thereby dropping the voltage of the generator and preventing it from carrying the overload.

The embodiment of my invention disclosed herein made use of a specific type of regulated converter, but it will be understood that other types of voltage controlling devices effective in maintaining constant voltage at the load terminals of a rectifier-type converter can be substituted without departing from the spirit of my invention.

The filter 14 shown in the drawing may often be omitted, especially when three-phase rectification is employed, or the resistance means 15 shown may include the resistance of a filter choke.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

I claim as my invention:

1. In combination, with a regulated rectifying arrangement having alternating current input terminals and direct current load terminals and having regulating means responsive to the voltage across said load terminals, resistance means in said rectifying arrangement having an input terminal and an output terminal, said output terminal being connected to one of said load terminals, a direct current generator having an armature and a series field, circuit means connecting said armature to said load terminals through said series field whereby said generator and said rectifying arrangement can both supply current to the same load, and means for balancing the voltage drop across said series field against the voltage drop across said resistance means and for changing the current through said series field when an unbalanced condition occurs.

2. In combination with a voltage regulating arrangement comprising a rectifier connected between alternating current input terminals and direct current load terminals, a source of unidirectional reference voltage, and regulating means responsive to the difference between the voltage of said source of reference voltage and the voltage across said load terminals, a direct current generator having an armature and a series field winding, circuit means for connecting said armature to said load terminals through said series field winding, a resistance connected between said rectifier and said load terminals, and circuit means connecting the input terminal of said resistance to the junction between said armature and said series field winding, whereby current may be supplied to or diverted away from said series field to regulate the output voltage of said generator.

3. In combination with a voltage regulating arrangement comprising a rectifier connected between alternating current input terminals and direct current load terminals, a source of unidirectional reference voltage, and regulating means responsive to the difference between the voltage of said source of reference voltage and the voltage across said load terminals, a direct current generator having an armature and a series field winding, circuit means for connecting said armature to said load terminals through said series field winding, a resistance having its input terminal energized from said rectifier and having its output terminal connected to one of said load terminals, and circuit means connecting the junction between the armature and the series field to said input terminal of said resistance, whereby current may be supplied to or diverted away from the series field to regulate the output voltage of said generator.

4. In combination with a voltage regulating arrangement comprising a rectifier connected between alternating current input terminals and direct current load terminals, a source of unidirectional reference voltage, and regulating means responsive to the difference between the voltage of said source of reference voltage and the voltage across said load terminals, a direct current generator having an armature and a series field winding, first circuit means connecting said armature to said load terminals through the series field winding, resistance means connected between said rectifier and said load terminals, and second circuit means connecting the junction between said armature and said series field to the input terminal of said resistance means for regulating the output of said generator.

5. In combination with a voltage regulating arrangement comprising a rectifier connected between alternating current input terminals and direct current load terminals, a source of unidirectional reference voltage, and regulating means responsive to the difference between the voltage of said source of reference voltage and the voltage across said load terminals, a direct current generator having an armature and a series field winding, first contacting means connecting said armature to said load terminals through said series field winding and connecting the junction between said armature and said series field to the input terminal of said resistance, and second contacting means for shorting out said resistance when said first contacting means is opened.

6. In combination, with a regulated rectifying arrangement having alternating current input terminals and direct current load terminals, resistance means in said rectifying arrangement having an input terminal and an output terminal, said output terminal being connected to one of said load terminals, a direct current generator having an armature and a series field, circuit means connecting said armature to said load terminals through said series field whereby said generator and said rectifying arrangement can both supply current to the same load, and means for balancing the voltage drop across said series field against the voltage drop across said resistance means and for changing the current through said series field when an unbalanced condition occurs.

References Cited in the file of this patent

UNITED STATES PATENTS

| Number | Name | Date |
| --- | --- | --- |
| 509,499 | Thomson | Nov. 28, 1893 |
| 574,914 | Lamme | Jan. 12, 1897 |
| 843,489 | Parsons et al. | Feb. 5, 1907 |
| 1,134,659 | Wright | Apr. 6, 1915 |
| 1,160,750 | Perkins | Nov. 16, 1915 |
| 1,289,430 | Fortescue | Dec. 31, 1918 |
| 1,617,130 | McDonald | Feb. 8, 1927 |
| 1,654,979 | Knight | Jan. 3, 1928 |
| 2,503,880 | Mah | Apr. 11, 1950 |